United States Patent [19]
Bahl et al.

[11] 3,833,900
[45] Sept. 3, 1974

[54] IMAGE COMPACTION SYSTEM

[75] Inventors: Lalit R. Bahl, Yorktown Hgts., N.Y.; Daniel I. Barnea, Tel Aviv, Israel; Hisashi Kobayashi, Mohegan Lake, N.Y.

[73] Assignee: International Business Machines Corporation, Armonk, N.Y.

[22] Filed: Aug. 18, 1972

[21] Appl. No.: 281,895

[52] U.S. Cl... 340/347 DD, 178/DIG. 3, 340/172.5, 235/154

[51] Int. Cl. ............................................... H04l 3/00

[58] Field of Search... 340/347 DD, 172.5, 146.3 Q, 340/146.3 H; 235/154; 178/DIG. 3

[56] References Cited

UNITED STATES PATENTS

| | | | |
|---|---|---|---|
| 2,921,124 | 1/1960 | Graham | 178/DIG. 3 |
| 3,051,778 | 8/1962 | Graham | 178/DIG. 3 |
| 3,061,672 | 10/1962 | Wyle | 178/DIG. 3 |
| 3,185,823 | 5/1965 | Ellersick, Jr. et al. | 340/347 DD |
| 3,347,981 | 10/1967 | Kagan et al. | 178/DIG. 3 |
| 3,474,442 | 10/1969 | Centanni | 340/347 DD |
| 3,478,266 | 11/1969 | Gardenhaire et al. | 178/DIG. 3 |
| 3,521,241 | 7/1970 | Rumble | 178/dig. 3 |

*Primary Examiner*—Charles D. Miller
*Attorney, Agent, or Firm*—Victor Siber

[57] ABSTRACT

A data compaction system wherein segmented binary data that has redundancy between segments is compacted by means of differential run-length encoding. For compaction of document digitized data, the segments represent lines on the document. Black image points on the document which are represented by a "1" are coded relative to the position of a 1 appearing in the line above the one being coded. The differential distance between binary 1 bit positions on successive lines are coded in accordance with a compaction code. Codewords having a small number of bits are used for small differentials.

6 Claims, 11 Drawing Figures

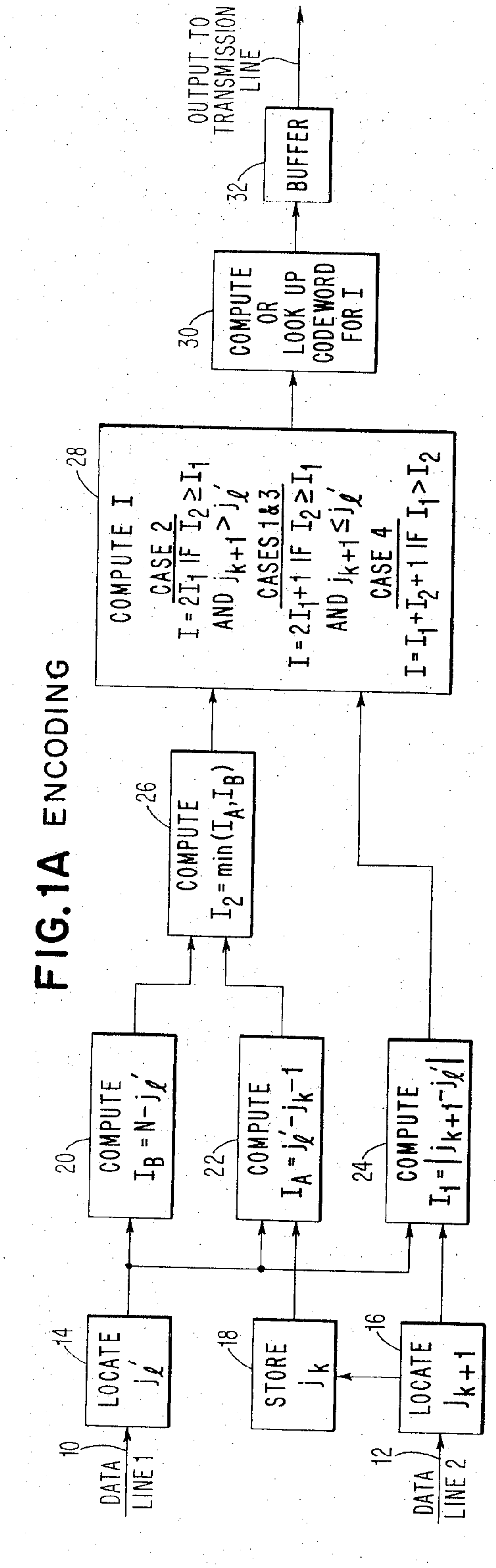
FIG.1A ENCODING
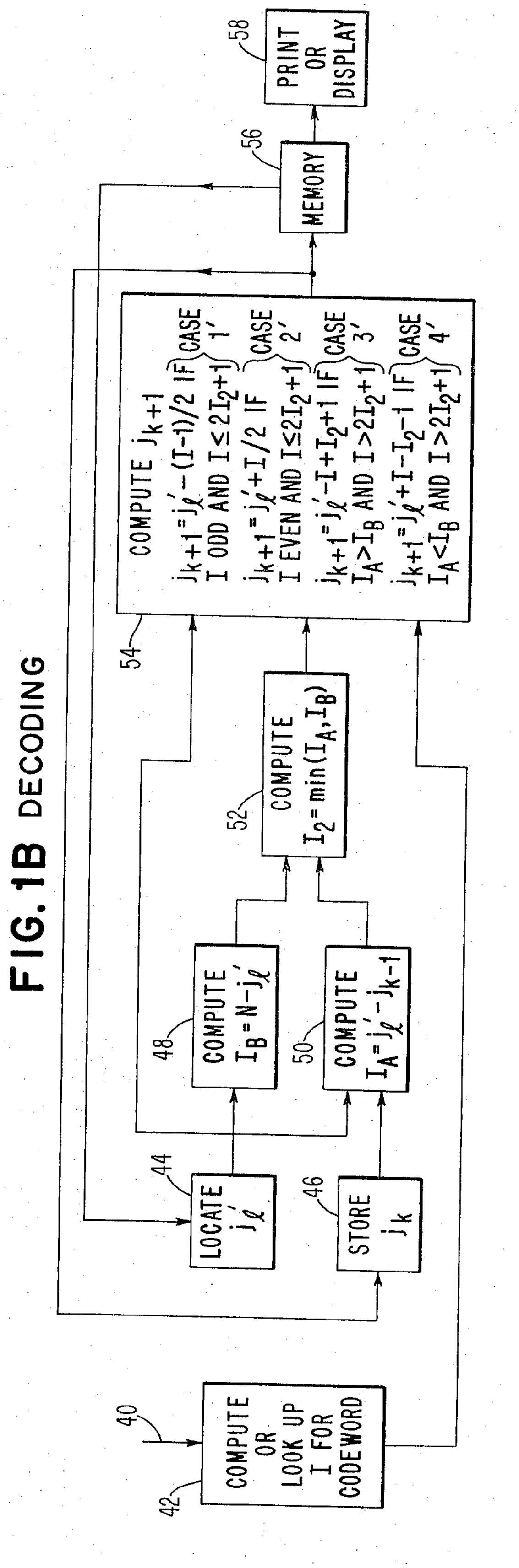
FIG.1B DECODING

PROBABILITY DISTRIBUTION OF A BINARY "1" AT SUCCESSIVE BIT POSITIONS ON LINE i AS USED IN CONVENTIONAL RUN-LENGTH ENCODING

PROBABILITY DISTRIBUTION OF A BINARY "1" AT SUCCESSIVE BIT POSITIONS ON LINE i AS USED IN DIFFERENTIAL ENCODING

EXAMPLES OF CALCULATION OF I

FIG. 5

EXAMPLE OF DIFFERENTIAL ENCODING

| BIT POSITION | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 |
|---|---|---|---|---|---|---|---|---|---|---|---|---|---|---|---|---|---|---|---|---|---|---|---|---|---|---|---|---|---|---|---|---|---|---|---|---|
| LINE i-1 | 0 | 0 | 0 | 1 | 0 | 0 | 0 | 0 | 0 | 0 | 1 | 0 | 0 | 0 | 0 | 1 | 0 | 0 | 0 | 0 | 0 | 0 | 1 | 0 | 0 | 0 | 0 | 0 | 0 | 0 | 0 | 0 | 0 | 0 | 1 | 0 |
| LINE i | 0 | 0 | 0 | 1 | 0 | 0 | 0 | 0 | 0 | 0 | 0 | 1 | 0 | 1 | 0 | 0 | 0 | 0 | 0 | 0 | 0 | 1 | 0 | 0 | 0 | 0 | 1 | 0 | 0 | 0 | 0 | 1 | 0 | 0 | 0 | 0 |
| $I_A$ | | | | 3 | | | | | | | | 6 | | | 3 | | | | | | | 1 | | | | | 0 | | | | | | | | 7 | |
| $I_B$ | | | | 32 | | | | | | | | 25 | | | 20 | | | | | | | 20 | | | | | 13 | | | | | | | | 1 | |
| $I_1$ | | | | 3 | | | | | | | | 6 | | | 3 | | | | | | | 1 | | | | | 0 | | | | | | | | 1 | |
| $I_2$ | | | | 0 | | | | | | | | 1 | | | 2 | | | | | | | 6 | | | | | 4 | | | | | | | | 3 | |
| $I$ | | | | 1 | | | | | | | | 2 | | | 5 | | | | | | | 8 | | | | | 5 | | | | | | | | 5 | |
| CODEWORD | | | | 0 | | | | | | | | 100 | | | 11001 | | | | | | | 1110000 | | | | | 11001 | | | | | | | | 11001 | |

| I | CODEWORD | LENGTH |
|---|---|---|
| 1 | 0 | 1 |
| 2 | 100 | 3 |
| 3 | 101 | 3 |
| 4 | 11000 | 5 |
| 1062 | 111111111100000100110 | 21 |

IMAGE COMPACTION SYSTEM

BACKGROUND OF THE INVENTION

This invention relates to data compaction and more particularly to a system for compacting segmented binary information having a degree of redundancy, such as digitized document data.

In the transmission of digital data, it is very desirable to reduce the amount of physical data that is necessary to be transmitted. Various techniques have been presented in the art of facsimile copiers in order to achieve compaction of binary data for transmission. One approach is presented in "Entropy of Printed Matter" by R. B. Arps, Report 31, Stanford Electronics Laboratory, 1969. Predictive coding techniques such as discussed in the Arps' article, generally predict information bits based on surrounding image points about the one to be predicted and then sum the prediction with the actual information bit by modulo-2 addition. This results in an error pattern which is very sparse in binary "1's" since the information generally tends to have a high degree of redundancy and most predictions are found to be correct. Other examples of predictive coding devices are disclosed in U.S. Pat. No. 2,905,756, to R. E. Graham, issued Sept. 22, 1959.

A coding scheme which may be used effectively to compact data when the input sequences have long periods of relatively constant signals is run-length coding. With this type of coding scheme, each bit in a data sequence is compared with the preceding bit in the data sequence and an output code of 1 is generated only when there is a change. A count is kept of the number of 0's between successive 1 output signals, and this count is encoded and fed to the circuit output. One problem with run-length encoding is that during periods of rapid fluctuation in the input data, this coding scheme may result in data expansion rather than data compaction. For example, in coding a series of document lines that represent a dense typewritten text, long strings of common data bits are generally not found except, for areas where background information is present. An example of a run-length encoder is shown in U.S. Pat. No. 3,213,268 issued Oct. 19, 1965, to F. W. Ellersick, Jr.

While the prior art has recognized the redundancy which is present in digitized document data and has presented various schemes for encoding such data, generally, the data stream is treated as a long string of binary information and redundancy is taken advantage of on a single line or stream basis or by examining points in a small local area.

OBJECTS OF THE INVENTION

Therefore, it is an object of the present invention to provide a data compaction system having an encoding device that encodes data by a coding scheme that takes advantage of the redundancy between successive lines in a document.

It is a further object of the present invention to provide a data compaction system wherein successive line segments are coded by means of a differential compaction code.

It is a further object of the present invention to successively encode lines in a digitized document by transmitting a code word indicating the differential between the positions of binary ones on two successive lines.

SUMMARY OF THE INVENTION

This invention relates to a data compaction system wherein successive lines of binary data representative of a digitized document are encoded by a differential code. The differential encoder takes advantage of the redundancy present between successive lines of information. That is, it is generally expected that where a binary 1 is found on line $i$-1 in bit position $j'_l$, then the probability of finding a binary 1 on the succeeding line $i$ is higher for bit positions near $j'_l$ than for position further away from $j'_l$. Based on a probability distribution function indicating the probabilities associated with the binary 1's on a succeeding line relative to the presence of a binary 1 in the preceding line, an integer is computed that is indicative of the differential between two binary 1's in succeeding lines. Four possible cases are used in computing this integer. The integer value is then used to develop a compaction code that is a function of the probability distribution. Thus, binary 1's on succeeding lines that are relatively close to one another and have a small differential, have associated therewith a short codeword. The decoding of the differential compaction code is performed by using an inverse of the encoding rules that were used to develop the integer value and the compaction code.

BRIEF DESCRIPTION OF THE DRAWINGS

FIGS. 1A and 1B are a block diagram representation of a data compaction system.

FIG. 5 is a diagrammatic representation of an example of the encoding process as it would apply to two successive lines in a digitized document.

FIGS. 6A, 6B and 6C represent a circuit diagram of a device for carrying out differential encoding.

THEORY OF THE CODE

Figure 2:
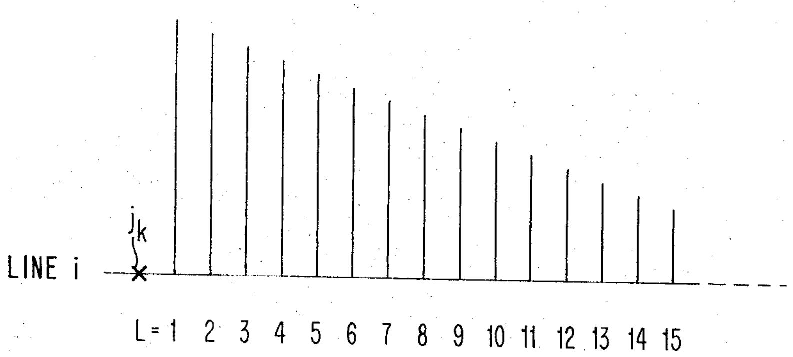
FIG. 2 is a graph of the probability distribution of a binary 1 being present at successive bit positions on a document line as used in conventional run-length encoding, given that the value at the $j_k$th position is 1.

In conventional run-length encoding, it is generally desired to code the positions of binary 1's in each line. Assuming there are $n$ binary 1's in a line $i$, at positions $(i,j_1)$, $(i,j_2)$, ..., $(i,j_n)$, and that the coder has just finished encoding the presence of a 1 binary bit in position $j_k$. Then the next binary 1 bit can be present in any of the N—$j_k$ positions $j_k$+1, $j_k$+2, ..., N, where N represents the last bit position in line $i$. The most likely position for the next binary 1 to occur is $j_k$+1, the next most likely is $j_k$+2, etc. The probabilities associated with the positions where the next most likely binary 1 position is to occur is shown in FIG. 2. The vertical lines in FIG. 2 give an indication of the probability of finding a binary 1 bit at each bit position, a taller line indicating a higher probability. If the next binary 1 bit following $(i,j_k)$ is in position $(i,j_{k+1})$, this bit position is encoded by the code word corresponding to $L = j_{k+1} - j_k$. Thus, each binary 1 on the line is transformed into an integer (its run-length from the previous binary 1 on the line), which is then encoded by some form of run-length coding. If the binary 1's occur more or less independently, the distribution of integers L is closely approximated by a geometric distribution, for which optimal coding schemes are known. For example, the scheme presented by S. W. Golomb, in "Run Length Encoding," IEEE Transactions on Information Theory, IT-12, pages 399–401, July 1966, may be utilized.

However, if the data being compacted represents a document having a strong correlation between information on successive lines, it is possible to use a differential code for specifying the position of each binary 1 in the line. It should be noted that the redundancy between successive lines is sometimes more pronounced if rather than coding a digitized document directly, the digitized information is first transformed into a prediction error pattern. An exemplary device for developing a prediction error pattern is disclosed in the Arps' article referenced above. It is also possible to use a very simple predictor such as one point predictor which uses only the previous point in the line to predict the succeeding point.

Figure 3:
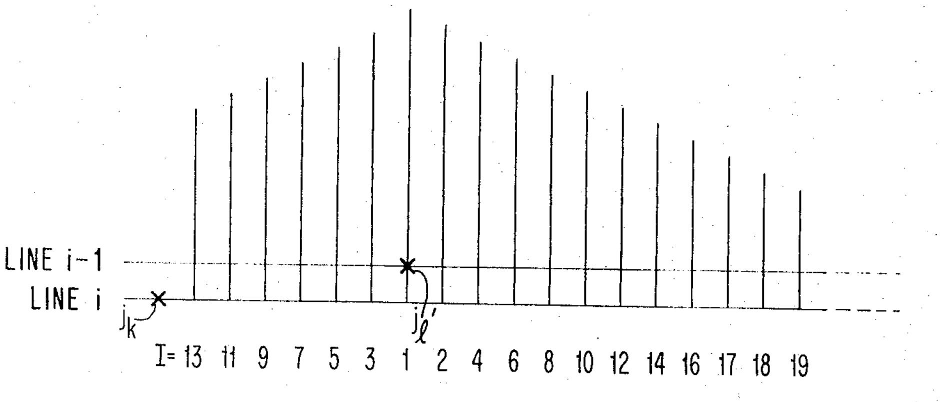
FIG. 3 is a graph representation of the probability distribution of a binary 1 being present at successive bit positions on document line $i$ as used in differential encoding, given that the value of $j_l$th position on line $i$—1 and the $j_k$th position on line $i$ are both 1.

In the differential encoding process presented herein, binary 1 positions on a previous line are utilized to encode 1 positions on a current line. Let the binary 1's in line $i-1$ be at positions $(i-1,j'_1)$, $(i-1,j'_2)$, ..., $(i-1,j'_n)$. As with conventional run-length coding, the (k+1)st binary 1 position can lie in any of the $N-j_k$ positions following $j_k$. The binary 1 on the previous line to be used as a reference point is defined by $j'_l = \min(j'_p : j'_p > j_k)$. If $j'_l$ is the position of the first binary 1 after position $j_k$ in line $i-1$, then, it is expected that the next error in line $i$ will be in the vicinity of $j'_l$. The most likely location of the $(k+1)$st binary 1 in line $i$ is $j'_l$, the next most likely locations are $j'_l + 1$ and $j'_l - 1$, etc. FIG. 3 graphically represents the probability distribution of finding a binary 1 at successive positions on line $i$ relative to the presence of a binary 1 at $j'_l$ in line $i-1$.

There are $I_A = j'_l - j_k - 1$ positions to the left of $j'_l$ and $I_B = N - j'_l$ positions to the right of $j'_l$ in which the binary 1 could occur. With each position on line $i$, there is associated an integer $I = 1, 2, ..., N-j_k$ which indicates its rank in terms of likelihood of occurrence of the (k+1)st binary 1 in that position. The integer I corresponding to the actual location of the binary 1 at $j_{k+1}$ can be calculated as follows:

Let $I_1 = | j_{k+1} - j'_l |$

Figure 4:
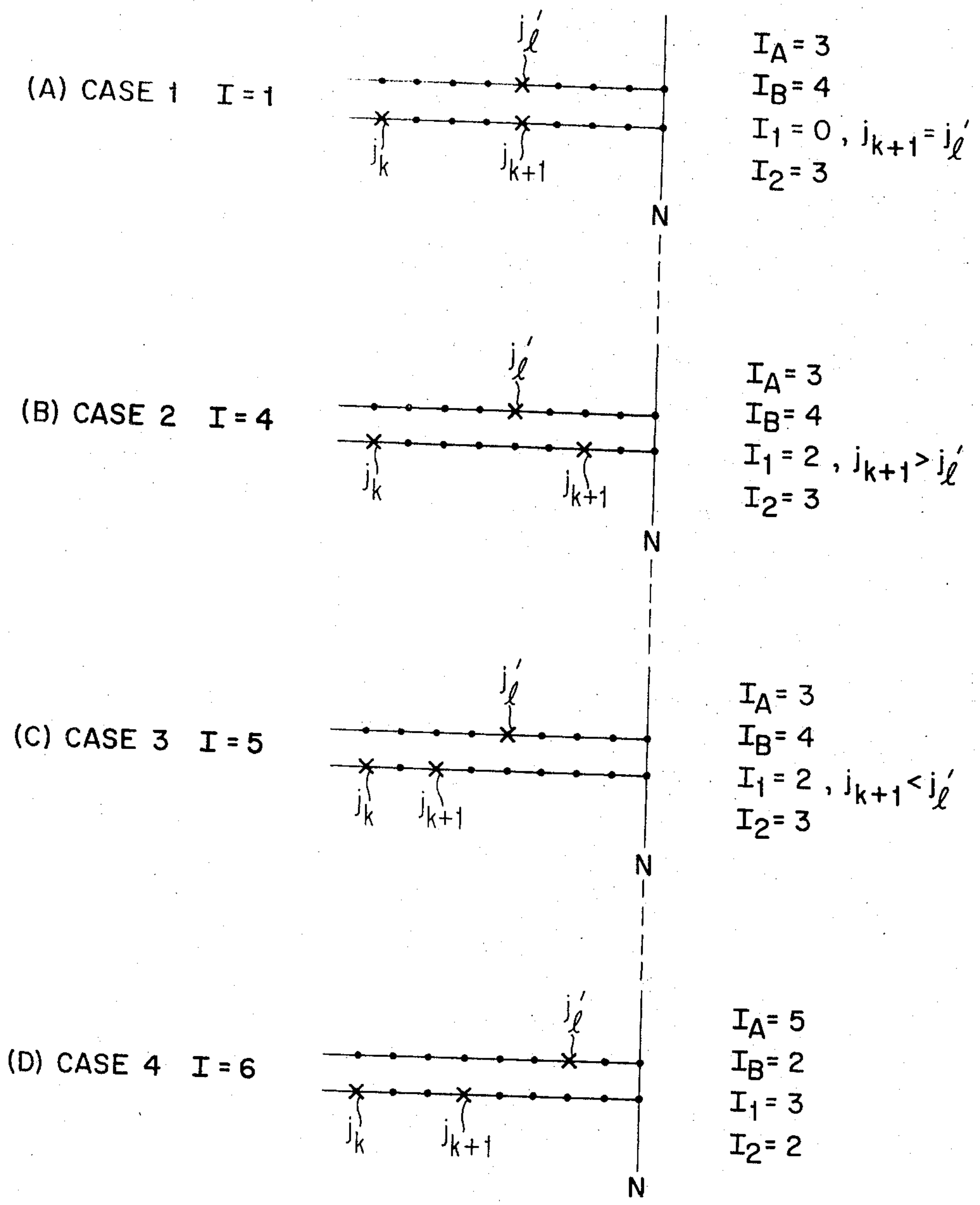
FIG. 4 shows examples of the four possible cases in the computation of a differential integer.

Let $I_2 = \min (I_A, I_B)$ then, there are four possible cases, examples of which are shown in FIG. 4.

The cases are as follows:

Case 1 — $I = 1$ if $I_1 = 0$

Case 2 — $I = 2I_1$ if $I_2 \geq I_1$ and $j_{k+1} > j'_l$

Case 3 — $I = 2I_1+1$ if $I_2 \geq I_1$ and $j_{k+1} < j'_l$

Case 4 — $I = 1+I_1+I_2$ if $I_2 < I_1$

It should be noted that case 1 may be included within case 3 by changing $j_{k+1} < j'_l$ to $j_{k+1} \leq j'_l$. The four cases shown in FIG. 4 illustrate the positions of the binary 1's in the lines $i-1$ and $i$, and the values of $I_A$, $I_B$, $I_1$ and $I_2$. The "X" notation in the FIG. 4 denotes the position of a binary 1 and the "." indicates a binary 0.

For a particular case, after computing the integer I, the compaction system would then encode that integer I by an appropriate compaction code. Since the probability distribution of the integer I is not geometric, conventional run-length coding methods such as described above, are not suitable for encoding I. It is found that the distribution for the integer I is very closely approximated by $$\text{probability } (I) \approx 2^{-(2b+1)} \text{ if } 2^b \leq I < 2^{b+1}$$

An optimal code for this distribution is obtained as follows:

Let $\gamma_1 \gamma_2 ... \gamma_b$ be the $b$ lower order bits in the binary representation of I where $2^b \leq I < 2^{b+1}$. Then, the codeword C(I) for I is defined by $$C(I) = \underbrace{1\,1\,.\,.\,.\,1}_{b}\ \overline{0\,\gamma_1\,\gamma_2\,.\,.\,.\,\gamma_b}$$

This code word C(I) consists of $b$ 1's followed by a 0, followed by the last b bits of the binary representation of I. If the integer I is contained in a counter, its code word is obtained by simply changing the highest order non-zero bit to zero and prefixing $b$ 1's. The first few code words are:

| I | C(I) |
|---|---|
| 1 | 0 |
| 2 | 100 |
| 3 | 101 |
| 4 | 11000 |
| . | . |
| . | . |
| . | . |
| 7 | 11011 |
| 8 | 1110000 |
| . | . |
| . | . |
| . | . |
| 15 | 1110111 |

and so on.

Referring now to FIG. 5, there is shown an example of the encoding process as it would apply to two lines of binary information. As indicated previously, the binary 1's in line $i$ are coded relative to the position of the binary 1's in line $i-1$. Each of the quantities necessary to compute the integer I is shown below the bit position. The associated binary 1's are identified by the line connecting the binary 1 from line $i-1$ to the binary 1 in line $i$. After having the integer I, the codeword is computed in accordance with the procedure discussed above, and is shown in the example. This example is merely illustrative and is not intended to represent an actual information pattern.

DETAILED DESCRIPTION OF THE INVENTION

Referring now to FIGS. 1A and 1B, there is shown a block diagram representation of the data compaction system having differential encoding means for coding successive lines in a digitized document. Two successive lines of binary information representing the document data are introduced via leads 10 and 12 to locate means 14 and 16, respectively. Locate means 14 determines the position of the binary 1 in data line 1 which represents the data in document line $i-1$. Store means 18 contains $j_k$ which is the location or bit position in data line 2 of the last binary 1 found. Data line 2 represents the data in document line $i$. After having found the location of the binary 1's in data lines 1 and 2, a computation is made at block 20 to determine the quantity $I_B = N - j'_l$. The quantity $I_B$ indicates the distance from the binary 1 on data line 1 to the edge of the line 1. Simultaneously, during the computation of $I_B$ at block 22, the quantity $I_A$ is computed in accordance with the relationship $I_A = j'_1 - j_k - 1$. The quantity $I_A$ represents the distance between the previously found binary 1 on data line 2 and the position of the binary 1 on data line 1. At the same time that quantities $I_A$, and $I_B$ are computed, a computation is performed at block 24 to determine the quantity $I_1 = |j_{k+1} - j'_l|$, which quantity represents the "differential" between the binary 1 in data line 2 and the binary 1 position in data line 1.

Prior to computing the integer value I from which the differential run-length code word is computed, the quantity $I_2$ is determined in block 26 in accordance with the relationship $I_2 = \min(I_A, I_B)$. Now having the quantities $I_B$, $I_A$, $I_1$ and $I_2$, a determination is made as to the applicable case under which an integer I is computed, in accordance with the equations shown in FIG. 1A. This is done at block 28. For the purpose of facilitating the understanding of the invention and simplifying the description thereof, cases 1 and 3 as shown in FIG. 4 have been combined as representing one case. The case under which I is determined is a function of a compariosn between the quantities $I_1$ and $I_2$ and the relative values of $j_{k+1}$ to $j'_l$. Essentially, the four cases represented in block 28 take into consideration the coding of a binary 1 position on data line 2 at all possible locations of a binary 1 present in data line 1.

After having computed the integer I, a computation or table look-up is performed at block 30 to determine the appropriate codeword representing the particular integer I that was computed at block 28. This codeword is then loaded into buffer 32 and is then output to a transmission line for communication to a receiving station. It should be noted, that while the description of the invention herein relates to the transmission of compacted information, the principles of the invention are equally applicable to devices for storing compacted data on storage mediums such as magnetic disks, tapes, or equivalent devices.

The received codewords are accepted at a terminal along line 40. Each codeword is then decoded by looking up the appropriate integer I corresponding to the codeword at block 42. Assuming that the decoding process is operating on information appearing somewhere in the middle of the document, then the quantities $j'_l$ and $j_k$ are available at blocks 44 and 46, respectively. Having these quantities $j'_l$ and $j_k$, a computation is performed at blocks 48 and 50 to determine the quantities $I_B$ and $I_A$. Then, the quantity $I_2$ is computed by selecting the minimum of either $I_A$ or $I_B$. This is done at block 52.

Now having all of the necessary quantities, that is, $I_A$, $I_B$, $I_2$, $j_k$, and $j'_l$, a computation is performed at block 54 to compute the position $j_{k+1}$ of the next binary 1 in the particular line being decoded. Decode case 1' corresponds to the decoding of the codeword developed in accordance with cases 1 and 3 as performed in the encoder. Case 2' corresponds to the decoding of the codeword for integer I computed in accordance with case 2 in the encoder. Cases 3' and 4' correspond to the decoding of the codeword for integer I computed under case 4 in the encoder. After $j_{k+1}$ is computed at block 54, a binary 1 is stored in memory 56 at a location corresponding to $j_{k+1}$ and all intervening positions between $j_k$ and $j_{k+1}$ are filled with binary 0's. The decoding process as shown in FIG. 1B continues until the entire document is decoded and stored in memory 56. At that point, the document may be printed or displayed by any conventional print or display means at block 58. It should be recognized, by those skilled in the art, that the document could be printed or displayed serially rather than as an entire block of data, this being a matter of design choice.

Figures 6, 6A:
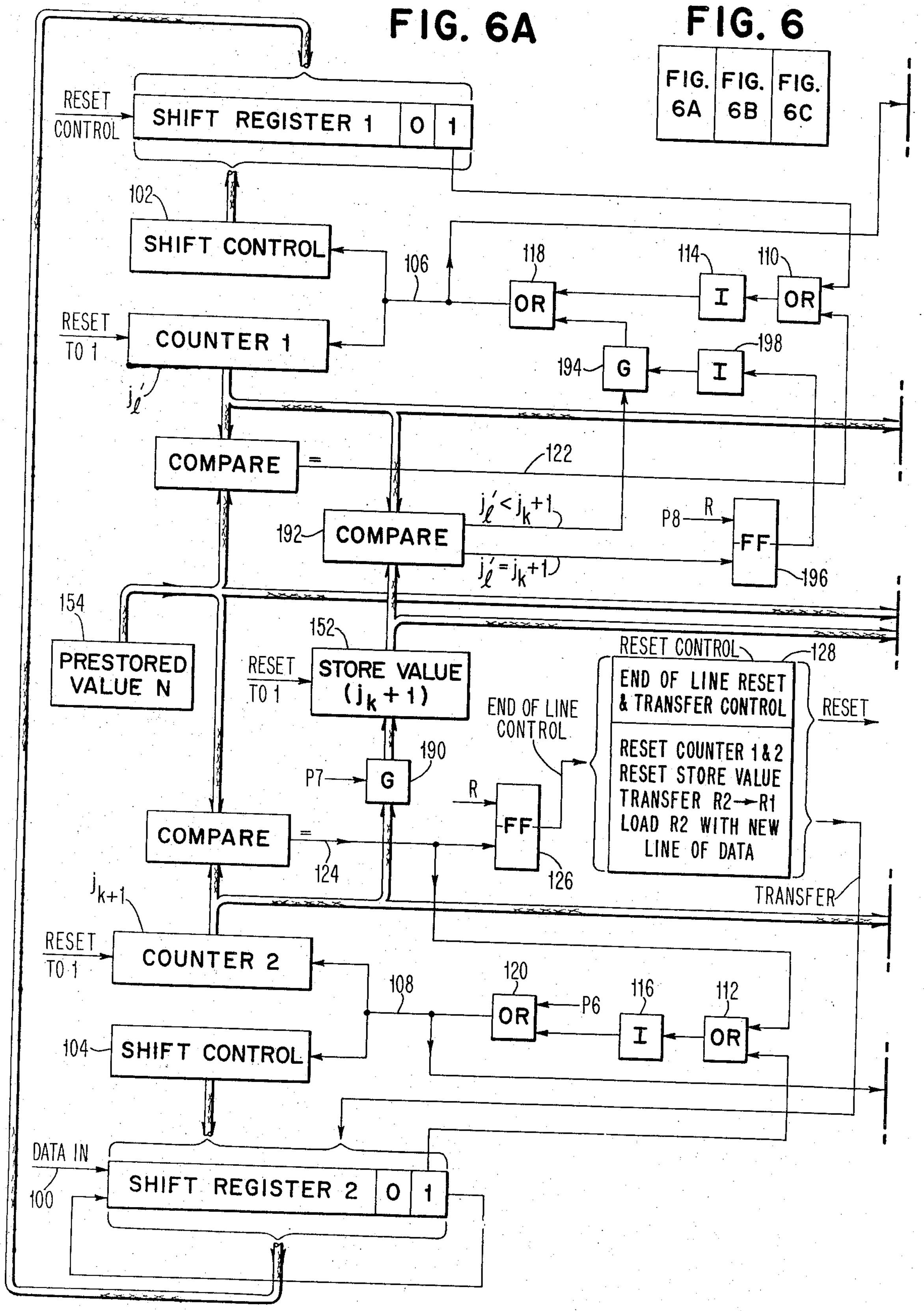
FIG. 6 illustrates how
FIGS. 6A, 6B and 6C are interconnected.
Figure 6B:
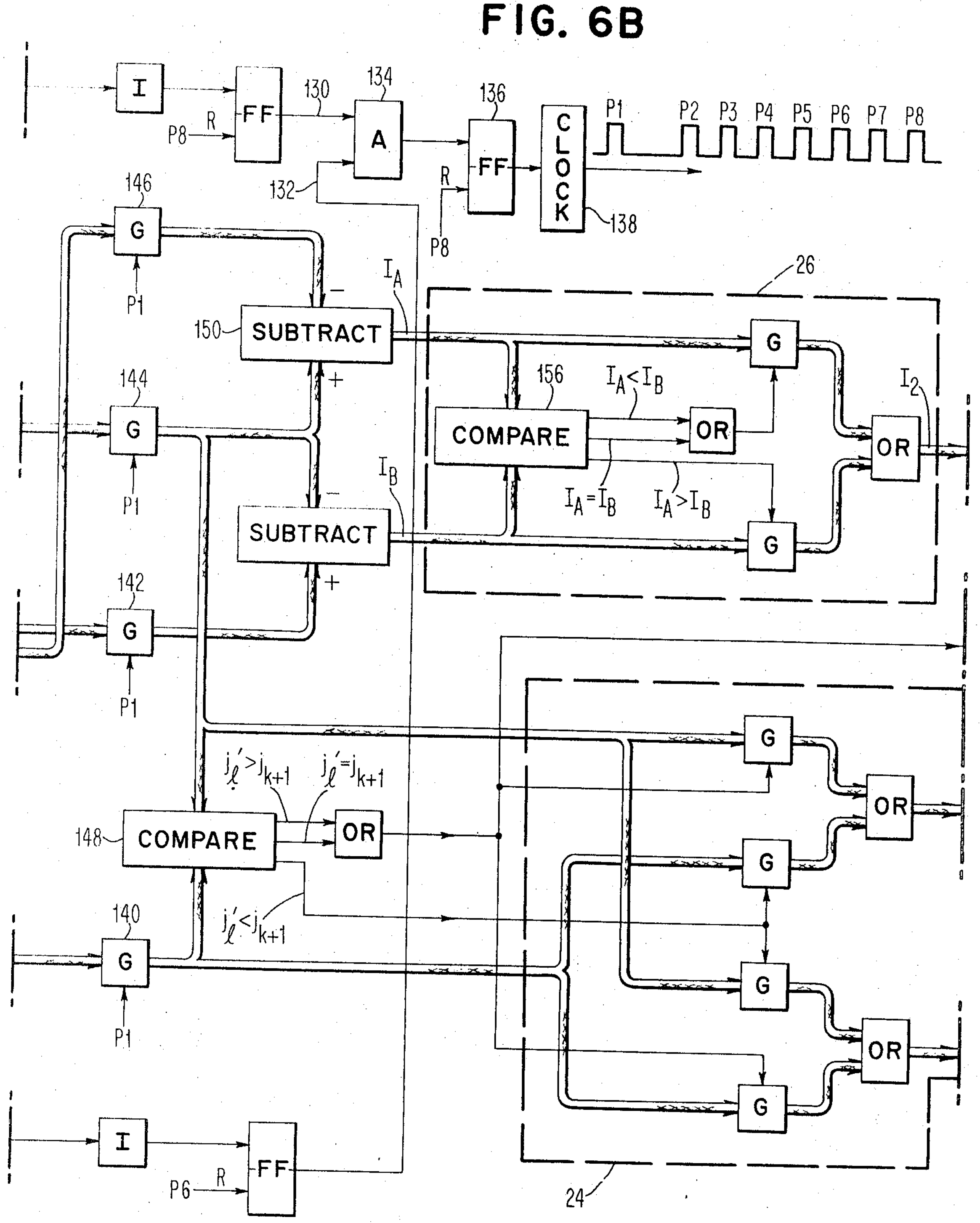
Figure 6C:
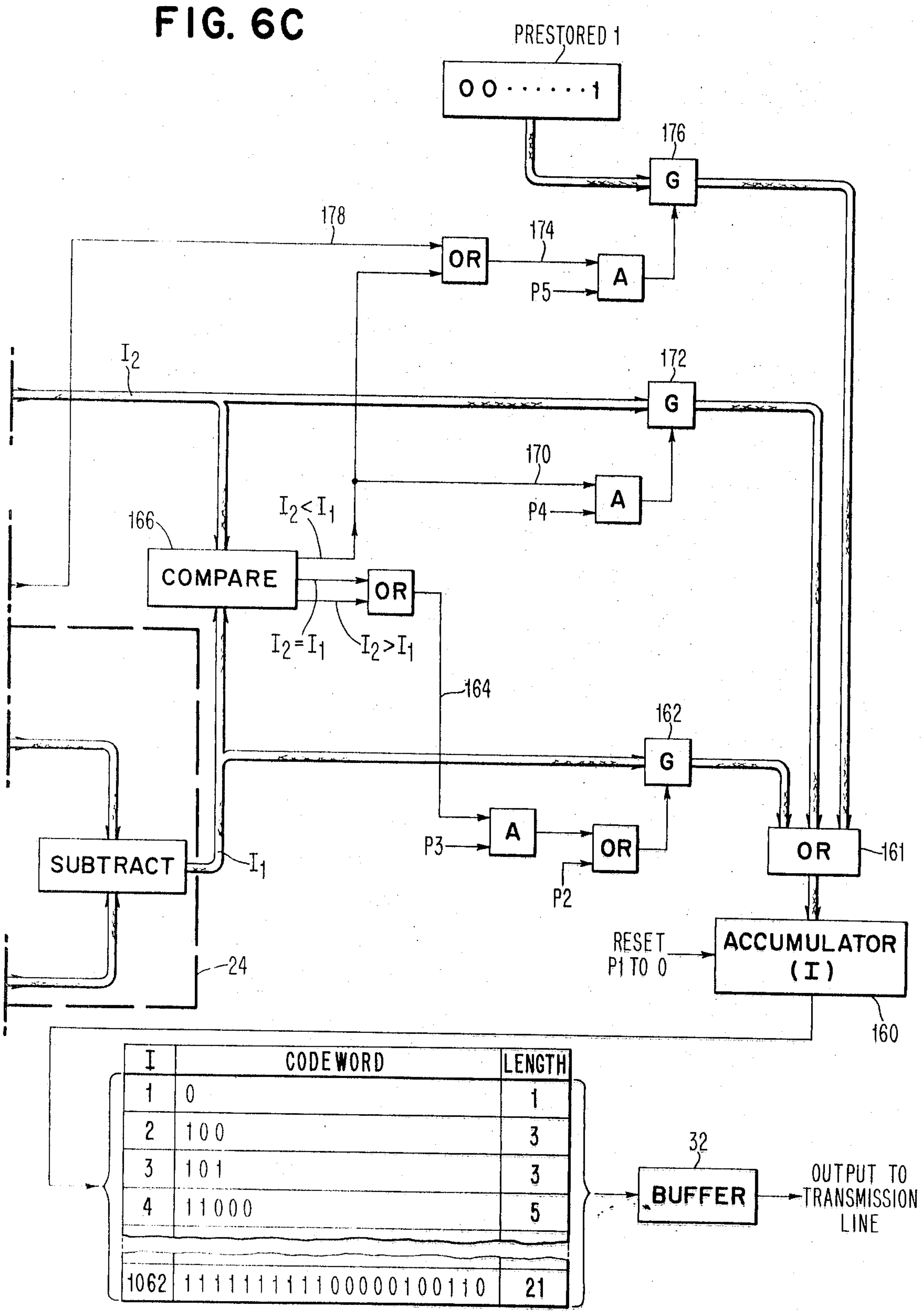

Now referring to FIGS. 6A, 6B and 6C, there is shown a circuit diagram for the differential encoding device shown in FIG. 1A for computing the integer I. The coder operates on two successive document lines represented as binary streams which are located in shift registers 1 and 2, respectively. For the purpose of illustration and ease of understanding, the encoder of FIGS. 6A through 6C will be described in terms of its running operation. It is assumed that initialization of all flip-flops, counters, accumulators and associated circuitry had been performed and that the encoder has been operating on successive lines of information. At some point in the encoding of the document data, line $i-1$ will be present in shift register 1 and line $i$ will be present in shift register 2. The encoder operates by continually shifting the information in shift registers 1 and 2 and examining for the presence of binary 1's at each bit location in the lines. Based on the counts which are recorded, an integer I is computed in accordance with the procedure described with regard to FIGS. 1A and 1B above. All information is introduced into the encoder by means of Data In line 100 which is the input to shift register 2. After the encoding for line $i$ is completed, the data corresponding to line $i$ is transferred into shift register 1 and line $i+1$ is loaded into shift register 2. This transfer of successive lines continues until the entire document data is encoded.

Beginning with the data corresponding to lines $i-1$ in shift register 1 and line $i$ in shift register 2, shift control means 102 and 104 begin shifting the binary digits in their corresponding shift registers one bit position to the right until a binary 1 is detected at the right-most element in each of the shift registers. Note, that shift register 2 is of a recirculating type thus permitting the integrity of line $i$ to be maintained for further transfer to shift register 1 after the encoding is complete. Associated with shift controls 102 and 104 are counter 1 and counter 2. These counters contain the count of the number of shifts performed by their respective shift registers prior to the finding of a binary 1 in the right-most position of the registers. Counters 1 and 2 operate simultaneously with shift control means 102 and 104, respectively.

Assuming that the encoder has been in operation and a certain number of binary 0's have been shifted in both shift registers 1 and 2 until the binary 1's have been found, counts will be contained in counters 1 and 2 indicating these number of shifts. The shift registers 1 and 2 stop by means of shift control means 102 and 104 not receiving a 1 pulse on lines 106 and 108. That is, so long as a 0 is found in the right-most position of the shift registers 1 and 2, OR gates 110 and 112 will in combination with inverters 114 and 116 present a binary 1 signal level at the input of OR gates 118 and 120 so as to drive shift control means 102 and 104 to effect a further shift of binary information in their associated shift registers. The presence of a binary 1 signal level at the right-most cell position of the shift registers causes a 0 pulse level on lines 106 and 108 and accordingly shift control means 102 and 104 inhibit further shifting of the information in the shift registers 1 and 2. Shift control means 102 and 104 continue operation after the integer I has been computed for the $j_{k+1}$ binary 1 located in shift register 2. Shift registers 1 and 2 are also capable of being stopped when the end of the lines $i-1$ and $i$ are detected. This is accomplished by comparing the counts in counters 1 and 2 with a prestored value N in store means 154, which represents the length of the binary representations of the document lines. A comparison of counters 1 and 2 with N resulting in an equal decision may present a 1 pulse on either lines 122 or 124. The 1 pulse on line 124 acts to set flip-flop 126 which activates the reset control means 128. When the end of line $i-1$ is found in shift register 1, a 1 pulse on line 122 inhibits further shifting of shift register 1 and the count in counter 1 which contains $j'_l$ will be equal to N. Then, all further binary 1's in shift register 2 will be coded relative to bit position N.

Assuming that the end of the line has not been reached, and that both shift registers 1 and 2 have been stopped by shift control means 102 and 104, then a 1 pulse will be present on leads 130 and 132 which are inputs to AND gate 134. A 1 output of AND gate 134 sets flip-flop 136 which starts clock 138 running. This clock 138 produces eight timing pulses in the sequence shown in FIG. 6B. The first pulse P1 opens gates 140, 142, 144, and 146 so as to gate the counter 2 value, value N, counter 1 value, and the value of $j_k+1$ to the computational circuitry for determining the integer I. The counter 2 value is compared with counter 1 value at comparator 148 to determine the relative positions of the binary 1 found in shift register 2 to the position of the binary 1 found in shift register 1. This comparison is necessary in order to compute $I_1$ in accordance with the relationship shown in block 24 of FIG. 1A. The computation is performed by the circuitry contained in block 24. This computation consists of a simple subtraction of the smaller quantity from the larger quantity and needs no further explanation at this point.

Simultaneous with the computation of $I_1$, the quantities $I_A$ and $I_B$ are computed. Subtractor 150 determines the quantity $I_A$ by subtracting the quantity stored in store means 152 which represents $j_k+1$ from the value found in counter 1 which represents $j'_l$. The quantity $I_B$ is computed by subtracting the quantity in counter 1 from the prestored value N found in store means 154 and which quantity represents the maximum size of the line.

After having computed the quantities $I_A$ and $I_B$, the quantity $I_2$ may be determined by selecting the minimum of $I_A$, $I_B$. This is accomplished by means of comparator 156 and the associated gating circuitry contained in block 26. Now having determined the quantities $I_1$ and $I_2$, the integer value I is computed for the appropriate case, under the control of clock pulses P2 through P5 in combination with summing logic. The integer I will be resident in accumulator 160 after the P5 clock pulse. When clock pulse P2 is up, a 1 pulse is presented to gate 162 which permits the quantity $I_1$ to be transferred into the accumulator 160 through OR gate 161. Subsequent to clock pulse P2, pulse P3 comes up, and if cases 1, 2 or 3 are present, a pulse on lead 164 in combination with P3 will cause the gate 162 to open thus permitting an addition of the quantity $I_1$ to the contents in accumulator 160. The determination of whether case 1, 2 or 3 is present is made by comparator 166 which compares the quantity $I_2$ with the quantity $I_1$. If the coding process is operating under case 2, the quantity in accumulator 160 would represent the appropriate integar I and no further computation is necessary and the remaining clock pulses have no effect on the accumulator 160. If case 4 is present, then at clock P4 time, a pulse would be present on lead 170 which in combination with clock pulse P4 open gate 172 which permits the quantity $I_2$ to be summed into the value contained in accumulator 160. Then, at clock P5 time, since a pulse will be present on line 174, gate 176 would be open and a binary 1 would be added to accumulator 160. The resulting quantity in the accumulator 160 is representative of the integer I for case 4. If on the other hand, the coding process was operating under case 1 or 3, clock P4 would have been ineffective to gate the quantity $I_2$ into the accumulator 160 since lead 170 would contain a 0 pulse value. At clock P5 time, a pulse would be present on lead 178 which is gated to lead 174 and opens gate 176 thus allowing the binary 1 to be added to the contents of accumulator 160. This would result in the appropriate integer I for case 1 or 3.

After having computed the integer I, a table look-up is performed using I as the index for determining the appropriate codeword. For the example presented herein, there are 1,062 possible codewords. It should be recognized, that this quantity is merely exemplary, as are the specific codewords shown. After having determined the codewords, the binary bit pattern corresponding to each codeword is loaded into the buffer 32 and then output to a transmission line. After the P5 clock pulse, P6 pulse come up which increment counter 2 to $j_k+1$. Then pulse P7 opens gate 190 to enable the quantity $j_k+1$ to be stored in store means 152. At this point, comparator 192 compare $j'_l$ with $j_k+1$. If $j'_l$ is smaller, then gate 194 is opened thus permitting the 0 level of the flip-flop 196 output, through inverter 198 to cause shift control 102 to operate shift register 1 until the contents of counter 1 equals $j_k+1$. Then shift control 102 continues to cause shift register 1 to shift and stop at the next binary 1.

At the receiver station, the decoding process for the differential run-length code received on the transmission line is similar to the process carried out by the coder shown in FIGS. 6A, 6B and 6C with the exception that the computations reflect the equations shown in block 54. These computations are simple in nature and may be implemented by conventional circuitry since they only comprise addition, subtractions and comparisons. The implementation of the equations shown in block 54 should be obvious to anyone of ordinary skill in the art, and are essentially similar to the encoding circuitry.

Figure 7:
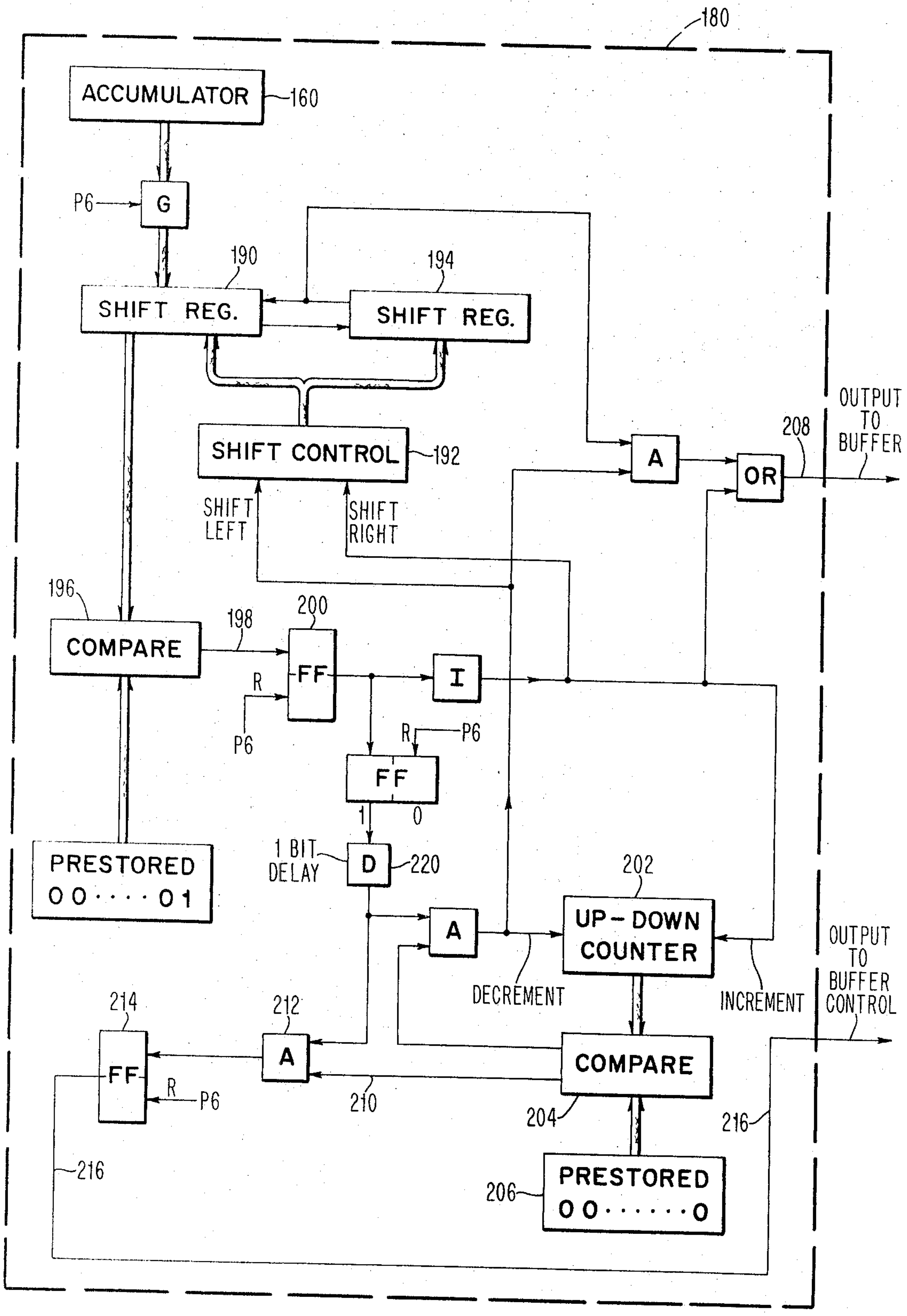
FIG. 7 is a circuit diagram of a device for constructing the codeword that is to be transmitted.

As an alternative to accomplishing the codeword determination by table look-up, a hardware structure for computing the codeword is shown in FIG. 7. For the particular code utilized in the disclosed embodiment, the codeword is computed by determining the length of the word representing the integer I, storing a plurality of binary 1's with a low order bit of 0 of same length as the word representing the integer I and then concatenating as low order bits, the actual binary bits from the integer I word minus the high order bit position.

In terms of the circuitry of FIG. 7, the codeword is computed by loading the integer I binary word into shift register 190. Shift control means 192 successively shift the binary word I from shift register 190 into shift register 194 one bit at a time under the control of the output of comparator 196 which looks for the pattern of all 0's with a low order binary 1 position in the rightmost storage cell of the shift register 190. When that pattern is detected, a pulse appears on line 198 which sets flip-flop 200 and stops further shifting by shift control means 192. At this point, the up-down counter 202 contains a count of the number of shifts that have been effected prior to the successful comparison of comparator 196.

During the shifting under the control of shift control 192, a series of 1 pulse levels are transmitted on lead 208 to the buffer for each shift control pulse emanating from shift control means 192. These series of 1 pulses represent the first part of the codeword. Following this first part, a single 0 is placed on line 208 during the time that the 1 bit delay 220 is inhibiting control of the up-down counter 202.

The count found in the up-down counter 202 is used to control a series of shifts by means of shift control 192 to transmit the binary information found in shift register 194 onto the output to buffer lead 208. This shifting out of register 194 places the binary word corresponding to integer I on the line 208 minus the high order bit position which is still found in shift register 190. When the comparator 204 detects a 0 count in up-down counter 202, it is known that the entire codeword has been output to the buffer along lead 208. At this time, the comparator 204 presents a pulse on lead 210 which activates AND gate 212 which in turn sets flip-flop 214. The output pulse of flip-flop 214 appearing on lead 216 is utilized to signal the buffer that the codeword is complete and no further sequencing in the buffer is necessary for the codeword I corresponding to the current I.

While the exemplary embodiment hereof has been described in terms of a probability distribution which has high probability of finding a binary 1 about the reference point $j'_l$, it should be recognized that other probability distribution assumptions could be used depending on the nature of the document that is digitized. Thus, in the general case, after determining a probability distribution reflecting the series of most likely occurrences of a binary 1 relative to the reference point $j'_l$, an integer I would be computed as a function of the derived probability distribution function. Furthermore, the probability distribution may be conditional on considerations other than the next presence of a binary 1 in the preceding line. For example, a plurality of binary 1's in the preceding line may be used in developing the differential code for a single binary 1 in the following line.

While the invention has been described in terms of a digitized document in binary form and the development of differential codes for black image points on succeeding lines, it should be recognized that the disclosed differential encoder could be applied to compacting a prediction error pattern developed by any appropriate predictor. Also, it may be possible to increase the efficiency of the differential run-length code if a precoder prior to entry of the subject compaction system introduced a degree of redundancy on successive lines. One way of implementing such a precode is to build into the predictive error coding device a scheme for introducing deliberate errors on succeeding lines of information at points directly below actual predicted errors in succeeding lines.

What I claim is:

1. A system for encoding a binary message stream having a degree of redundancy comprising:

means for segmenting said message stream into continuous blocks, each block having (N) bit positions;

first locate means for locating the presence of binary 1's in a block ($i$—1) and recording the bit position ($j'_l$) associated with the binary 1's present in block ($i$—1);

second locate means for locating the presence of binary 1's in a block ($i$) and recording the bit position ($j_{k+1}$) associated with each binary 1 present in said block ($i$);

integer generating means for computing an integer (I) as a function of the differential bit position distance between each binary 1 in said block ($i$) and its associated binary 1 in said block ($i$—1);

codeword generating means receiving said integer (I) from said integer generating means for providing a unique codeword for each possible integer (I);

output means for transmitting said codeword to a receiving station whereby the length of said codeword is dependent on the value of said integer I.

2. The system as defined in claim 1 wherein said message represents a digitized document and said continuous blocks are continuous scan lines of said document.

3. The system as defined in claim 2 wherein said integer generating means comprises:

means for computing the quantity ($I_B$) in accordance with the relationship $I_B = N - j'_l$, where (N) is the last bit position in a scan line and ($j'_l$) is the bit position of a binary 1 in said line ($i$—1);

means for computing the quantity ($I_A$) in accordance with the relationship $I_A = j'_l - j_k - 1$, where $j_k$ is the bit position of the previous found binary 1 on line ($i$);

means for computing the quantity ($I_1$) in accordance with the relationship $I_1 = |j_{k+1} - j'_l|$, where $j_{k+1}$ is bit position of a presently found binary 1 on line ($i$);

means for computing the quantity ($I_2$) by selecting the minimum of the quantities ($I_A$) and ($I_B$);

means for computing the integer (I) in accordance with the one of the relationships $I = 2I_1$ if $I_2 \geq I_1$ and $j_{k+1} > j'$ $I = 2I_1 + 1$ if $I_2 \geq I_1$ and $j_{k+1} \leq j'_l$ $I = I_1 + I_2 + 1$ if $I_1 > I_2$.

4. The system as defined in claim 3 wherein said codeword generating means comprises:

store means having a plurality of variable length codewords each identified with a unique index number;

store look-up means for accessing one of said variable length codewords by using said integer (I) as an index to said store means and for providing the accessed codeword to said output means.

5. The system as defined in claim 4 wherein said receiving station comprises:

means for receiving said codewords;

means for determining the integer (I) corresponding to each received codeword;

means for computing the bit position $j_{k+1}$ from th integer (I) in accordance with one of the following relationships:

$j_{k+1} = j'_l - (I-1)/2$
if $I$ is ODD and $I \leq 2I_2+1$ $j_{k+1} = j'_l + I/2$
if $I$ is EVEN and $I \leq 2I_2+1$ $j_{k+1} = j'_l - I + I_2 + 1$
if $I_A > I_B$ and $I > 2I_2+1$ $j_{k+1} = j'_l + I - I_2 - 1$
if $I_A < I_B$ and $I > 2I_2+1$;

means for reconstructing the digitized document from said bit position $j_{k+1}$.

6. A system as defined in claim 3 wherein said codeword generating means comprises:

first shift register means for receiving said integer (I);

second shift register means connected to said first shift register;

control means for referentially shifting the binary representation of said integer (I) contained in said first shift register into said second shift register until only the high order bit remains in said first shift register;

counter means connected to said control means for maintaining a count of the number of shifts executed;

pulse output means associated with said counter for transmitting a binary 1 for each increment of said counter;

means for transmitting a binary 0 after said pulse output means stops;

said shift control means shifting the contents of said second shift register onto the output line following said binary 0.

* * * * *